UNITED STATES PATENT OFFICE.

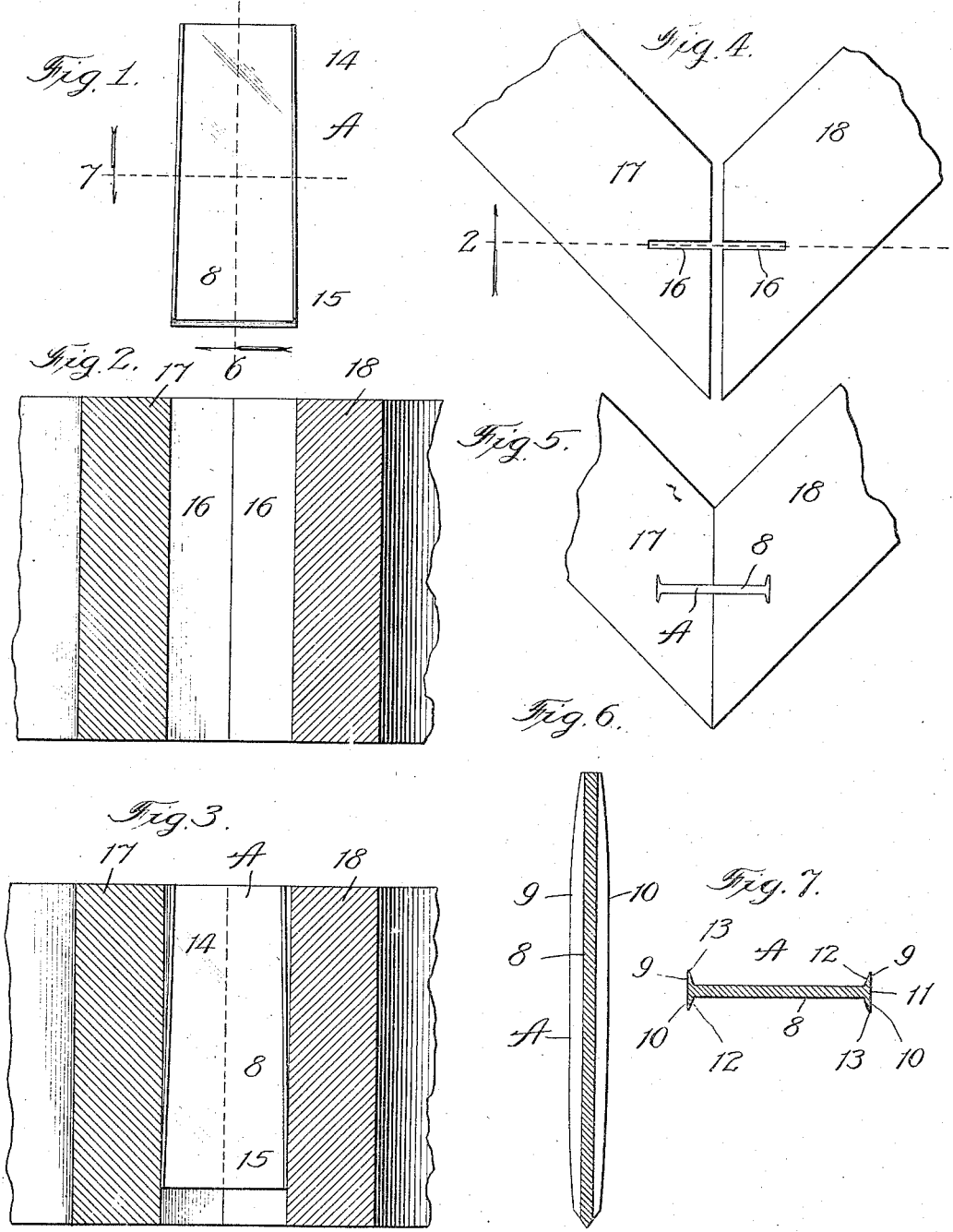

HUGO R. SIEGLER, OF CHICAGO, ILLINOIS.

FASTENING DEVICE.

1,368,460.  Specification of Letters Patent.  Patented Feb. 15, 1921.

Application filed September 19, 1913. Serial No. 790,650.

*To all whom it may concern:*

Be it known that I, HUGO R. SIEGLER, a citizen of the United States, residing at Chicago, in the county of Cook and State of Illinois, have invented certain new and useful Improvements in Fastening Devices, of which the following is a specification.

This invention relates to a fastening device for securing the corners or meeting ends of wood structures and is especially adapted for permanently securing together the parts forming a miter-joint; and has for its object to provide a device of this kind possessing certain new and novel features.

Figure 1 is a side elevation of a fastening device embodying the improved features.

Fig. 2 is a vertical transverse section on line 2, Fig. 4.

Fig. 3 is a similar view showing the fastening device in place.

Fig. 4 is a plan of two corner pieces prepared to be joined together.

Fig. 5 shows the fastener inserted and the joint closed.

Fig. 6 is a vertical longitudinal section of the fastener on line 6, Fig. 1.

Fig. 7 is a horizontal transverse section on line 7, Fig. 1.

A represents a fastener which embodies the improvement and comprises a flat web or body part 8 and the double flanged edges 9 and 10 projecting at right angles from the web-part on each side, as best shown in Fig. 7. These flanges present a straight surface on outer side 11 and are beveled on the inner side, as at 12, to a sharp knife edge 13. The fastener is made slightly wedge-shape, that is, gradually widening from the head or driving end 14 to the driven end 15, as best shown in Figs. 1 and 3. The wider end of the fastener is inserted in the work first and as the operation of driving progresses, the wedge shape and the beveled flange surfaces 12 have the effect of drawing the work parts firmly together into a close fitting joint and entirely dispensing with the use of glue or other objectionable means. The joint made with the fastener is stronger than dovetailing and renders the use of an expensive dovetailing machine unnecessary in factory work.

The practical use of the nail is very simple and the operation easily understood, so that the work can be done by inexperienced persons without the necessity for employing skilled labor.

Preparatory to inserting the fastener, make a saw cut down the face of each side of the joint approximately five sixteenths of an inch in depth forming a kerf or groove 16, then drive the fastener into place. The saw cuts or kerfs will be about the same depths in the joining members 17 and 18 of the work so that one half of the fastener is let into each member or part, as shown in Figs. 3 and 5. The fibers of the wood will adhere closely to the flanged edges of the fastener and leave no openings or space. The fastener may be inserted so as to be embedded and the surface of the joint finished so as to leave no showing as to the means employed in securing the parts together. The work can be completed at once without having to wait for a setting, as is the case when glue or other adhesive composition is used.

Having thus described my invention, what I claim is:—

A metal nail of I-shaped cross-section comprising a relatively thick wedge shaped web cut from sheet metal with straight top and bottom edges and relatively very thin smooth sharp cutting upset flanges, whereby said web may lie in a saw kerf in adjoining pieces of wood while the opposing flanges by reason of their knife edge thinness may opposingly cut their way into the wood and remain lodged therein.

In testimony whereof I affix my signature in presence of two witnesses.

HUGO R. SIEGLER.

Witnesses:
A. H. STANTON,
G. E. CHURCH.